Aug. 25, 1925.
J. VENETTA
SURVEYING INSTRUMENT
Filed Sept. 2, 1924 2 Sheets-Sheet 1
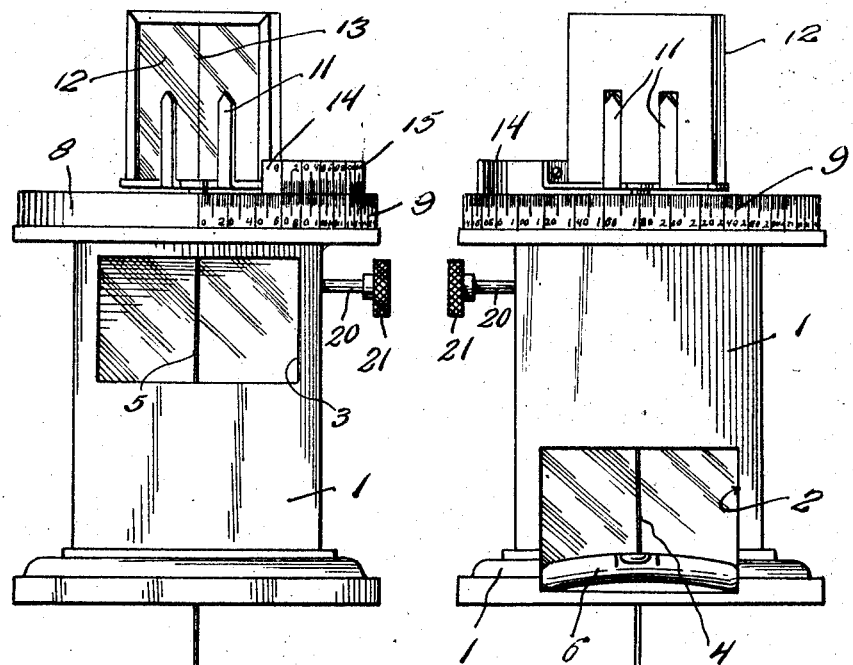
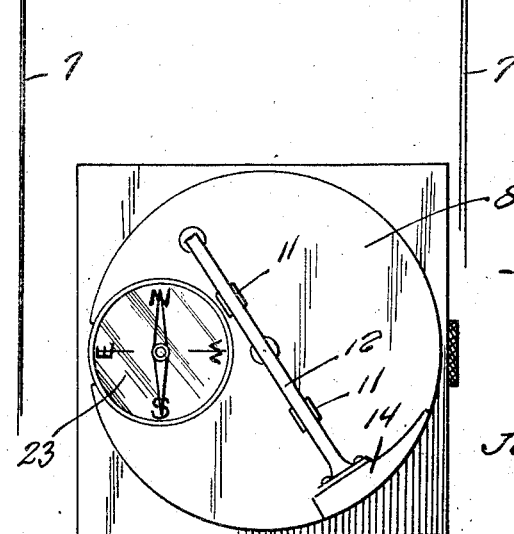
John Venetta,
Inventor
By Clarence A. O'Brien
Attorney

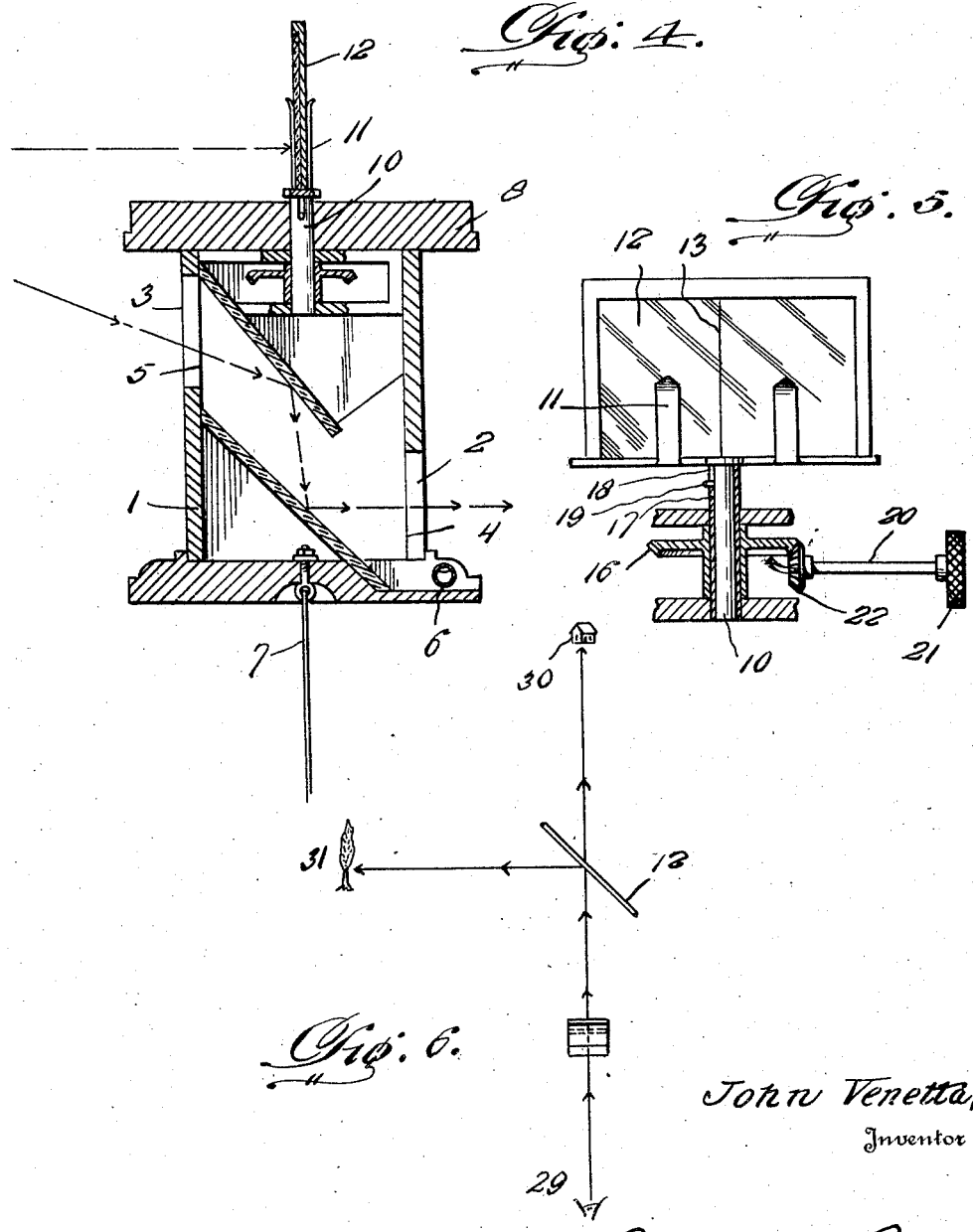

Patented Aug. 25, 1925.

1,551,182

UNITED STATES PATENT OFFICE.

JOHN VENETTA, OF WARREN, OHIO.

SURVEYING INSTRUMENT.

Application filed September 2, 1924. Serial No. 735,402.

*To all whom it may concern:*

Be it known that I, JOHN VENETTA, a citizen of the United States, residing at Warren, in the county of Trumbull and State of Ohio, have invented certain new and useful Improvements in a Surveying Instrument, of which the following is a specification.

This invention relates to surveying instruments and it consists in the novel features hereinafter described and claimed.

An object of the invention is to provide an instrument which may be easily and conveniently used for accurately determining the distance between fixed objects and the distance at which the said objects are from the point at which the instrument is located.

With the above object in view the instrument comprising a casing having a table mounted thereon, a compass embedded in the table and means as for instance a spirit level for positioning the casing and table level or horizontal. The table is provided at its edge with a series of graduations. A shaft is journaled for rotation at the center of the table and a frame is carried by said shaft and is disposed diametrically of the table. Means are provided for turning the shaft. A vertically disposed mirror is carried by the shaft and a series of graduations is carried by the frame and adapted to move over the graduations provided at the edge of the table. The mirror is provided upon its face with a vertically disposed line which is in alignment with the axis of the shaft. Spaced inclined mirrors are located in the casing and vertically disposed threads are located in the casing one at each side thereof and at the ends of the space between the interiorly located mirrors.

In the accompanying drawings:—

Figure 1 is a side elevation of the surveying instrument.

Figure 2 is a similar view looking at the side opposite to that which is shown in Figure 1.

Figure 3 is a top plan view of the surveying instrument.

Figure 4 is a transverse sectional view of the surveying instrument.

Figure 5 is a detailed fragmentary sectional view of the surveying instrument and showing parts in side elevation.

Figure 6 is a diagrammatic plan view indicating a mode of using the instrument.

As illustrated in the accompanying drawing, the surveying instrument comprises a casing 1 which is provided at one side with a sight opening 2 and at its opposite side with a sight opening 3. Vertically disposed thread lines 4 and 5 are disposed across the openings 2 and 3 respectively and are located exactly midway between the side walls of the casing 1. A spirit level 6 is mounted upon the base of the casing 1 at the lower edge of the sight opening 2. It is to be understood that the casing 1 may be mounted upon a tripod structure (not shown) or any other suitable means as for instance a rod 7 may be provided for supporting the said casing. If desired, the casing may be held in the hand of the operator. A circular table 8 is mounted upon the top side of the casing 1 and is provided around its periphery with a series of graduations 9. A vertically disposed shaft 10 is journaled at the center of the table 8 and carries at its upper end a frame 11 in which is located a vertically disposed mirror 12. The mirror 12 is provided at a point midway between its ends and in alignment with the axis of the shaft 8 with a hair line 13. The frame 11 is provided at one end with an arcuate arm 14 having upon its outer side a series of graduations 15 which are adapted to move over the graduations 9 as the frame and mirror are turned upon the table and as will be explained hereinafter. A beveled gear wheel 16 is located interiorly of the casing 1 and is fixed to the shaft 16 by means of a sleeve 17 which is carried at the center of the said gear wheel and which is provided with a slot 18 receiving a pin 19 which is carried by the shaft 10. A horizontally disposed shaft 20 is journaled in the casing 1 and one end of the said shaft 20 projects beyond the side of the casing and is provided with a knob 21. A beveled pinion 22 is carried at the inner end of the shaft 20 and meshes with the gear wheel 16 hereinbefore described. It is apparent that by turning the shaft 20 and by using the knob 21 that rotary movement will be transmitted to the shaft 10 through the intermeshing pinion and gear wheel 22 and 16 and the frame 11 and the mirror 12 may be turned above the upper surface of the table 8. A compass 23 is embedded in the upper surface of the table 8 and is disposed at one side of the shaft 10 and the center of the table 8.

In use the threads 4 and 5 are aligned with the eye (indicated at 29 in Figure 6) and with an object 30 as for instance a house as shown in the said figure. The mirror 12 is then turned so that the reflection of a tree 31 is brought upon the line 13 of the said mirror and visible by the eye 29. In so doing the plane of the mirror 12 will bisect the angle between the objects 30 and 31 and of which the apex of the angle is at the hair line upon the mirror.

When the mirror is so positioned the series of graduations 15 have been moved over the series of graduations 9 and by comparing the two series of graduations it may be definitely known to what extent the mirror has been turned in order to cause its plane to bisect the angle between the objects and by computing the graduations, the magnitude of the angle may be determined and by the known methods of triangulation it may be definitely determined as to the distance between the objects and also the distance of the objects from the eye of the observer.

Having thus described the invention, what I claim is:—

1. A measuring instrument comprising a casing provided at its opposite sides with sight openings and having vertically disposed threads extending across the openings at points midway between the ends of the openings, inclined spaced mirrors located in the casing between the sight openings, a table mounted upon the casing and provided with a series of graduations, a vertically disposed mirror mounted for turning movement at the center of the table and having a line disposed in alignment with the center of the table, said mirror carrying a series of graduations adapted to move over the first mentioned graduations and means for turning the mirror.

2. A measuring instrument comprising a casing provided at its opposite sides with sight openings and having threads disposed transversely across said openings, inclined spaced mirrors located in the casing between the openings, a spirit level carried by the casing, a table mounted upon the casing, a compass carried by the table, the table being provided with a series of graduations, a mirror mounted for turning movement at the center of the table and having a series of graduations adapted to be moved over the first mentioned series of graduations, means for turning the mirror and a hair line carried by the mirror and disposed vertically in alignment with the center of the table.

In testimony whereof I affix my signature.

JOHN VENETTA.